(12) United States Patent
Reynolds et al.

(10) Patent No.: US 9,490,743 B2
(45) Date of Patent: Nov. 8, 2016

(54) GROUNDING CLIPS AND TABS FOR MOUNTING COMPONENTS TO SOLAR MODULES

(71) Applicant: SunEdison, Inc., Maryland Heights, MO (US)

(72) Inventors: Charles Jonathan Reynolds, San Francisco, CA (US); Morgan Davis Smith, Berthoud, CO (US); Brian Gabriel Willkom, Santa Clara, CA (US); Christopher Thomas Needham, Sherman, TX (US)

(73) Assignee: SunEdison, Inc., Maryland Heights, MO (US)

( * ) Notice: Subject to any disclaimer, the term of this patent is extended or adjusted under 35 U.S.C. 154(b) by 0 days.

(21) Appl. No.: 14/289,360

(22) Filed: May 28, 2014

(65) Prior Publication Data

US 2015/0349166 A1    Dec. 3, 2015

(51) Int. Cl.
*H02S 40/34*        (2014.01)

(52) U.S. Cl.
CPC ............... *H02S 40/34* (2014.12); *Y02E 10/50* (2013.01)

(58) Field of Classification Search
CPC .......... F24J 2/52; F24J 2/5211; F24J 2/5245; F24J 2/5252; F24J 2/526; F24J 2/5262; F24J 2/5243; F24J 2002/5213; F24J 2/5233; F24J 2/5247; F24J 2/5241; F24J 2002/522; F24J 2002/0046; H01R 4/26
See application file for complete search history.

(56) References Cited

U.S. PATENT DOCUMENTS

| | | | |
|---|---|---|---|
| 2,258,342 A * | 10/1941 | Tinnerman | ............... 411/112 |
| 2,378,257 A | 6/1945 | Tinnerman | |
| 2,394,729 A | 2/1946 | Tinnerman | |
| 2,716,434 A | 8/1955 | Crowther | |
| 2,861,618 A | 11/1958 | Tinnerman | |
| 3,009,499 A | 11/1961 | Weihe | |
| 3,217,773 A | 11/1965 | Munse | |
| 3,229,743 A | 1/1966 | Derby | |
| 3,426,818 A | 2/1969 | Derby | |
| 3,669,170 A | 6/1972 | Schuster | |
| 4,074,491 A | 2/1978 | Bell et al. | |
| RE29,752 E | 9/1978 | Jaconette | |
| 4,325,598 A | 4/1982 | Leonardo | |
| 4,684,305 A | 8/1987 | Dubost | |
| 4,729,706 A | 3/1988 | Peterson et al. | |
| 4,778,321 A | 10/1988 | Okawa | |
| 4,793,753 A | 12/1988 | Muller et al. | |
| 4,897,005 A | 1/1990 | Peterson et al. | |
| 5,026,235 A | 6/1991 | Muller et al. | |
| 5,039,264 A | 8/1991 | Benn | |
| 5,176,482 A | 1/1993 | Reinl | |
| 5,339,500 A | 8/1994 | Muller et al. | |
| 5,423,646 A | 6/1995 | Gagnon | |
| 5,713,707 A | 2/1998 | Gagnon | |
| 5,746,609 A | 5/1998 | Franks, Jr. | |
| 5,890,858 A | 4/1999 | Leroux | |
| 5,893,694 A | 4/1999 | Wilusz et al. | |
| 5,961,264 A | 10/1999 | Postadan | |
| 5,971,686 A | 10/1999 | Stewart et al. | |
| 6,287,064 B1 | 9/2001 | Jhumra et al. | |
| 6,357,980 B1 | 3/2002 | Lansinger | |

(Continued)

*Primary Examiner* — Devina Pillay
*Assistant Examiner* — Daniel Malley, Jr.
(74) *Attorney, Agent, or Firm* — Armstrong Teasdale LLP (57) ABSTRACT

This disclosure generally relates to integrated grounding for solar modules and electrical wire management, and more specifically, to grounding clips and tabs that are integrated into solar module racking systems.

14 Claims, 8 Drawing Sheets

(56) References Cited

U.S. PATENT DOCUMENTS

| | | |
|---|---|---|
| 6,374,999 B1 | 4/2002 | Winkelman et al. |
| 6,398,596 B1 | 6/2002 | Malin |
| 6,450,747 B1 | 9/2002 | Fischer |
| 6,474,917 B2 | 11/2002 | Gauron |
| 6,688,825 B1 | 2/2004 | Stewart et al. |
| 6,854,941 B2 | 2/2005 | Csik |
| 6,971,830 B2 | 12/2005 | Hulin et al. |
| 7,182,563 B2 | 2/2007 | Wimmer et al. |
| 7,648,319 B1 | 1/2010 | Ochoa et al. |
| 7,896,596 B2 | 3/2011 | Rausch et al. |
| 7,959,392 B2 | 6/2011 | Cooley |
| 8,231,317 B2 | 7/2012 | De Gelis |
| 8,590,223 B2 | 11/2013 | Kilgore et al. |
| 8,845,257 B2 | 9/2014 | Kato |
| 2005/0036851 A1 | 2/2005 | Dang et al. |
| 2007/0248434 A1* | 10/2007 | Wiley et al. ............... 411/160 |
| 2011/0265860 A1* | 11/2011 | Ciasulli et al. ............ 136/251 |
| 2012/0211252 A1* | 8/2012 | Turziano et al. ............ 174/6 |
| 2014/0053891 A1* | 2/2014 | West ............... H01L 31/0424 |
| | | 136/251 |
| 2014/0220834 A1 | 8/2014 | Rizzo |
| 2014/0242853 A1 | 8/2014 | Martin et al. |
| 2014/0329420 A1 | 11/2014 | Magno |

\* cited by examiner

GROUNDING CLIPS AND TABS FOR MOUNTING COMPONENTS TO SOLAR MODULES

FIELD

This disclosure generally relates to integrated grounding for solar modules and electrical wire management, and more specifically, to grounding clips, and tabs that are integrated into solar module racking systems.

BACKGROUND

Solar modules convert solar energy into other forms of useful energy (e.g., electricity or thermal energy). Such modules typically include a laminate mounted in a frame and are positioned above an underlying support surface by a rack. The underlying support surface may be, for example, the roof of a building or the surface of the Earth.

The rack may be configured to rotate and position the solar modules at an angle relative to the support surface to minimize the angle of incidence between the solar module and the sun's rays. Minimizing this angle of incidence increases the amount of solar energy intercepted by the solar module. Racks are typically formed from a plurality of structural members including rails. These members may be assembled into a rack at a factory or other remote site and then transported to an installation location in this assembled state.

The rack-mounted solar modules are wired together to form photovoltaic (PV) arrays. Typically, the wiring requires module-to-module DC connections into for strings of modules in a series. The wiring also typically requires grounding the metallic frames of each solar module to the support structure. Accordingly, considerable labor may be involved when installing solar modules and forming arrays. For example, the electrical grounding of the solar modules may require considerable time, as electrical codes (e.g., UL Code 467) require a grounding wire to be mechanically attached to each solar module frame within an array, as well as to the overall rack assembly.

Although solutions currently exist to connect and ground the solar module frame to the rack, many solutions include multiple parts that are difficult and time consuming to assemble during installations. For instance, one method of grounding a solar module frame to a supporting rack includes placing conventional bolt stacks through holes in the solar module frame and supporting rail, locking the stacks in place with a nut, and using a special grounding washer. This grounding washer is used particularly for grounding, and does not serve a significant structural purpose. Currently, mounting hardware and grounding hardware are two separate assemblies, and are not integrated together. Installation of these additional grounding parts may require additional time, effort, and expense.

In addition, wire management solutions currently exist to secure electrical wires extending from the solar module, rack and related structures. However, many of these solutions include relatively expensive parts such as clips, cable ties, and fasteners that require time to install. Also, electrical wires running from the solar module, and between solar modules, are attached to supporting rails or other components of the array by relatively expensive, discrete parts that require considerable time and effort to install.

This Background section is intended to introduce the reader to various aspects of the art that may be related to various aspects of the present disclosure, which are described and/or claimed below. This discussion is believed to be helpful in providing the reader with background information to facilitate better understanding of the various aspects of the present disclosure. Accordingly, it should be understood that these statements are to be read in this light, and not as admissions of prior art.

BRIEF SUMMARY

A first aspect of the present disclosure is a solar module assembly. The assembly includes a solar panel, a frame, a grounding clip, and a rail. The frame is coupled to the solar panel and the rail is coupled to the frame. The grounding clip includes a u-shaped body, a nut, and a washer. The u-shaped body is attached to the frame and includes a first segment and a second segment spaced apart from the first segment, the first and second segment connected by a third segment. The nut is coupled to the first segment such that the nut is not rotatable with respect to the first segment. The washer is also coupled to the first segment. The rail includes a tab integrally formed thereon defined by a cutout formed in the rail. The tab is sized and shaped to support and position at least one electrical wire.

Another aspect of the present disclosure is a grounding clip assembly. The assembly includes a u-shaped body, a nut, and a washer. The u-shaped body is attached to a frame of a solar module. The u-shaped body includes a first segment and a second segment spaced apart from the first segment, the first and second segment connected by a third segment. The third segment is oriented substantially orthogonal to the first and second segments. The nut is coupled to the first segment such that the nut is not rotatable with respect to the first segment. The washer is also coupled to the first segment. The nut and washer are located on opposite sides of the first segment and the washer is positioned between the first segment and the second segment.

Another aspect of the present disclosure is a rail configured to attach a solar module in an array of solar modules to a rack assembly. The rail includes a tab integrally formed thereon. The tab is formed by a cutout formed in the rail. The tab is sized and shaped to support and position at least one electrical wire. The tab is adjustable between a first position and a second position. An elongated slot in the rail is substantially covered by the tab in the first position. The elongated slot is exposed when the tab is in the second position.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

The embodiments described herein generally relate to a racking system that integrates mounting and grounding features for solar modules. More specifically, embodiments described herein relate to clips that electrically ground solar modules in an array, and bend out tabs that manage and retain electrical cabling.

Figure 1:
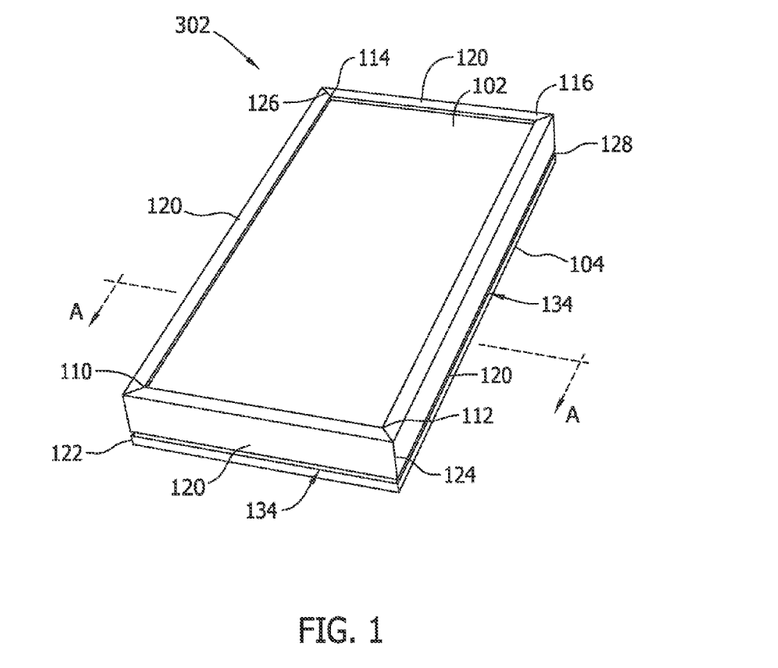
FIG. 1 is a perspective view of an example solar module.
Figure 2:
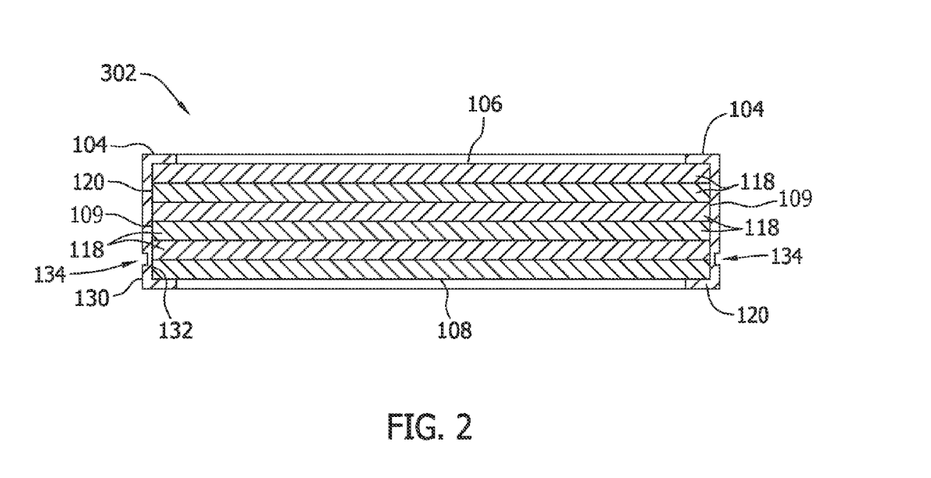
FIG. 2 is a cross-sectional view of the solar module shown in FIG. 1 taken along the line A-A.
Figure 3:
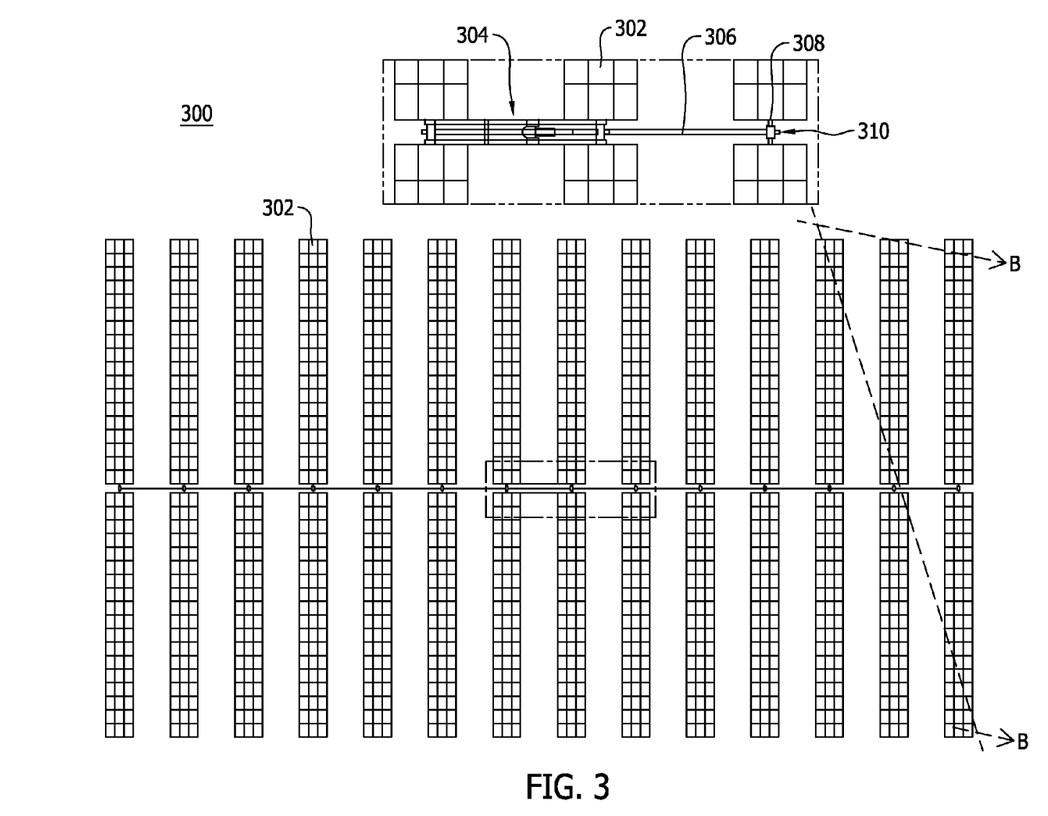
FIG. 3 is a plan, overhead view of an array of solar modules attached to a tracking system.

Referring initially to FIGS. 1, 2, and 3, a solar module is indicated generally at 302. A perspective view of solar module 302 is shown in FIG. 1. FIG. 2 is a cross sectional view of solar module 302 taken at line A-A shown in FIG. 1. Solar module 302 includes a panel, or laminate, 102 and a frame 104 circumscribing solar panel 102.

Solar panel 102 includes a top surface 106 and a bottom surface 108 (shown in FIG. 2). Edges 109 extend between top surface 106 and bottom surface 108. In the exemplary embodiment, solar panel 102 is rectangular shaped. In other embodiments, solar panel 102 may have any suitable shape including, for example, square, pentagonal, hexagonal, etc. In the exemplary embodiment, solar panel 102 defines four corners 110, 112, 114, and 116.

As shown in FIG. 2, the exemplary solar panel 102 has a laminate structure that includes several layers 118. Layers 118 may include for example glass layers, non-reflective layers, electrical connection layers, n-type silicon layers, p-type silicon layers, and/or backing layers. In other embodiments, solar panel 102 may have more or fewer, including one, layers 118, may have different layers 118, and/or may have different types of layers 118.

As shown in FIG. 1, frame 104 circumscribes solar panel 102. Frame 104 is coupled to solar panel 102, as best seen in FIG. 2. Frame 104 assists in protecting Edges 109 of solar panel 102. In the exemplary embodiment, frame 104 is constructed of four frame members 120. In other embodiments frame 104 may include more or fewer frame members 120. In the exemplary embodiment, frame 104 defines four corners 122, 124, 126, and 128, which may also be referred to as the corners of solar module 302. Each corner 122, 124, 126, and 128 is adjacent and corresponds to one corner 110, 112, 114, and 116 of solar panel 102. Corners 122, 124, 126, and 128 each define an angle that is substantially the same as the angle of the corner 110, 112, 114, and 116 of solar panel 102 to which it corresponds. In the example embodiment the angle is ninety degrees. In other embodiments, the angle may any angle suitable for positioning adjacent a corner of solar panel 102.

Exemplary frame 104 includes an outer surface 130 spaced apart from solar panel 102 and an inner surface 132 adjacent solar panel 102. Outer surface 130 is spaced apart from and substantially parallel with inner surface 132. In the exemplary embodiment, frame 104 is made of aluminum. More particularly, in some embodiments frame 104 is made of 6000 series anodized aluminum. In other embodiments, frame 104 may be made of any other suitable material providing sufficient rigidity including, for example, rolled or stamped stainless steel, plastic or carbon fiber.

Frame 104 includes a channel 134 extending from outer surface 130 of frame 104 toward inner surface 132. In the exemplary embodiment, channel 134 is a single channel that extends substantially continuously around the entire perimeter of frame 104. In other embodiments, channel 134 may be discontinuous and/or may comprise a plurality of channels. Channel 134 is located adjacent both sides of each corner 122, 124, 126, and 128. In other embodiments, channel 134 may be located adjacent a single side of each corner 122, 124, 126, and 128.

Figure 7:
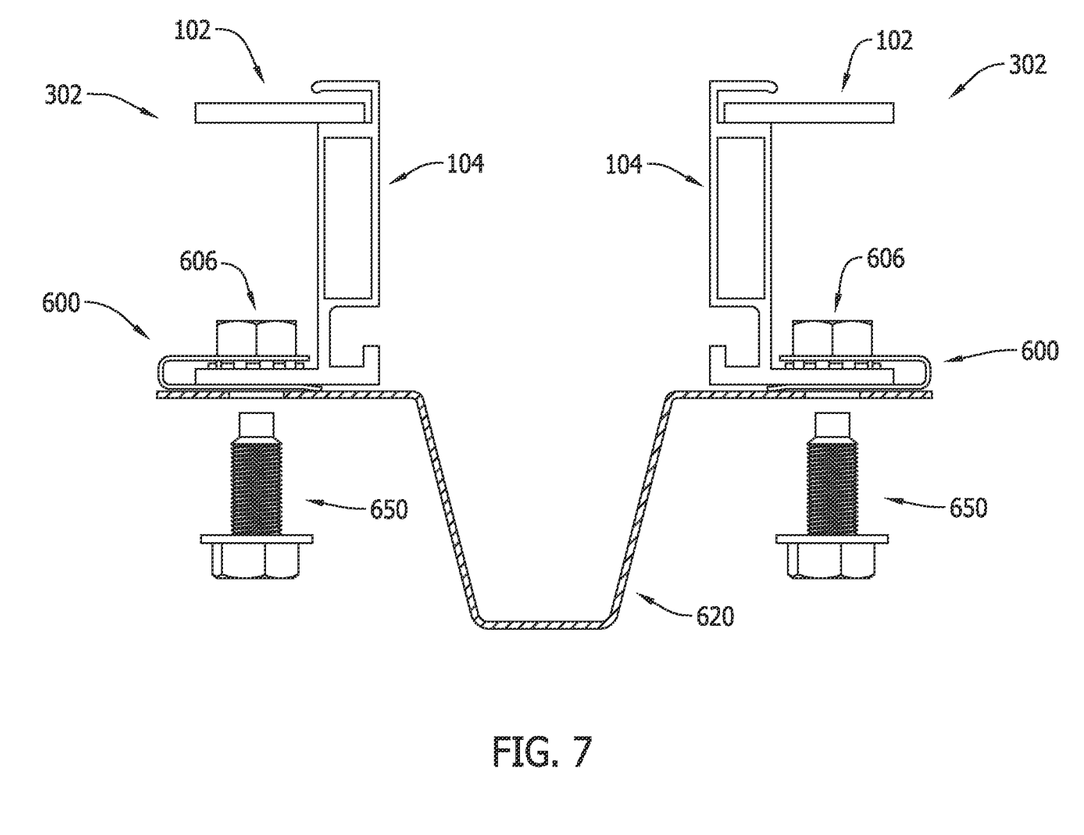
FIG. 7 is an exploded planar view of the connection between two solar modules shown in FIG. 6 taken along the line E.

In addition to the exemplary frame 104 in FIG. 2 which only encompasses the thickness of solar panel 102, other embodiments, including the frame 104 in FIG. 7, include a frame with portions extending beyond the thickness of the solar panel 102.

FIG. 3 illustrates an example of an array 300 of solar modules 302. Each row of solar modules 302 is mounted on a torque tube 308, and torque tube 308 are interconnected by a bearing assembly 310 and linkage bar 306. At the location between the multiple rows of solar modules 302 is an actuator 304 which is used to displace linkage bar 306 and thereby rotate torque tubes 308 and the attached solar modules 302 to track solar activity.

Figure 4:
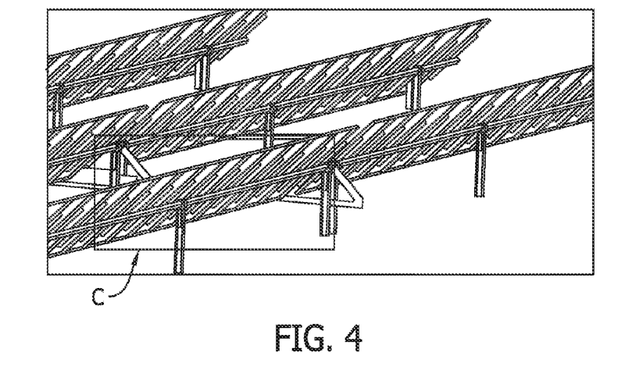
FIG. 4 is a perspective view of a portion of the solar module array shown in FIG. 3 taken along the line B-B.
Figure 5:
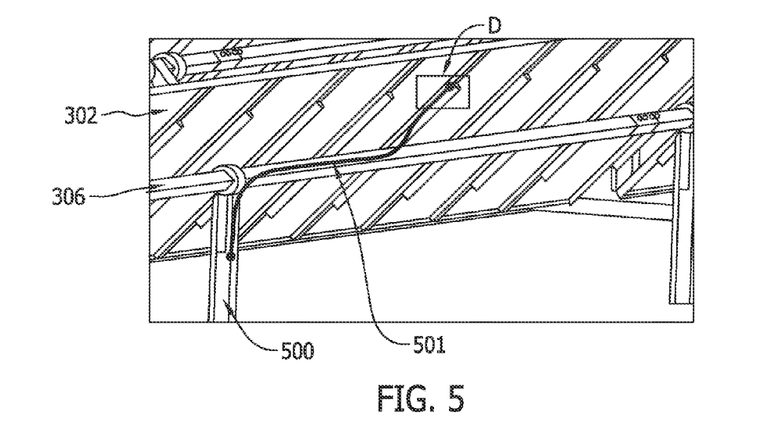
FIG. 5 is a perspective view of a portion of the solar module array in box C shown in FIG. 4.
Figure 6:
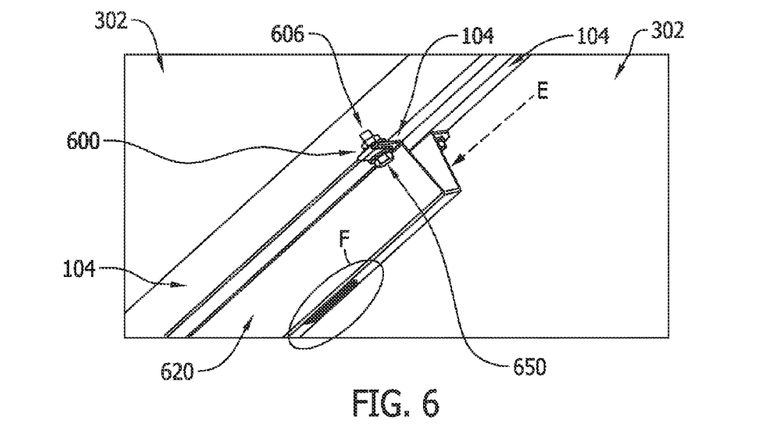
FIG. 6 is a view a portion of the solar module array in box D shown in FIG. 5.

FIGS. 4-6 show an example embodiment of the underside mechanical connections of the solar module array 300. The view from FIG. 4 through FIG. 6 is progressively enhanced to view placement of a grounding clip assembly that includes a grounding clip 600 and a fastener 650, on solar module array 300. FIG. 6 shows more clearly an example embodiment of the connection between solar modules 302 and rail 620 using the clip assembly.

FIG. 7 is an exploded plan view of the connection between solar modules 302 and rail 620 shown in FIG. 6 taken along the line E. As shown, each solar panel 102 is coupled to a frame 104. A grounding clip 600, to be described more fully below, is slid onto a portion of each frame 104 to allow attachment (e.g., bolting) and grounding between frame 104 and rail 620. In another embodiment, grounding clip 600 is slid around both frame 104 and rail 620. When grounding clip 600 is positioned correctly, fastener 650 extends through apertures formed through rail 620, solar module 302, and grounding clip 600 to engage nut 606, thereby attaching the structures together. In the example embodiment, fastener 650 is threadably secured to nut 606 to a prescribed torque specification. Also included, but not shown, is/are grounding wire(s) connected at location(s) on or between fastener 650 and nut 606.

Figure 8:
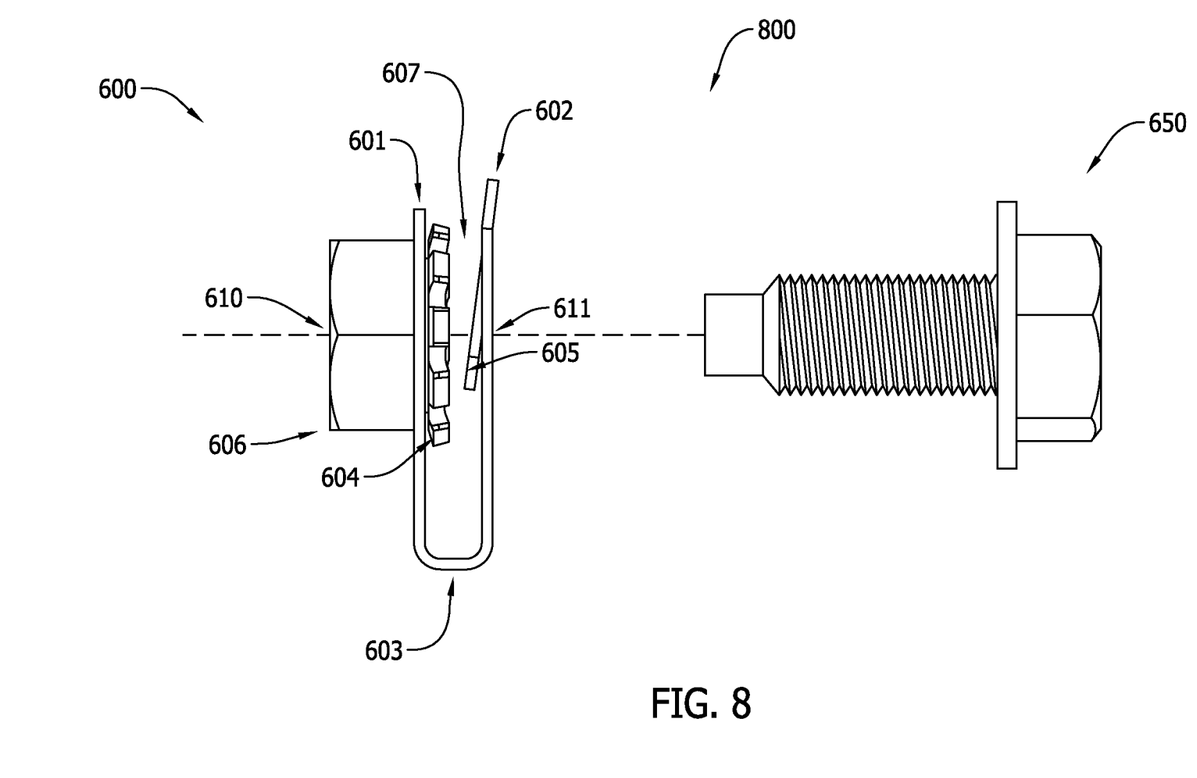
FIG. 8 is an example of the clip assembly shown in FIG. 7.
Figure 9:
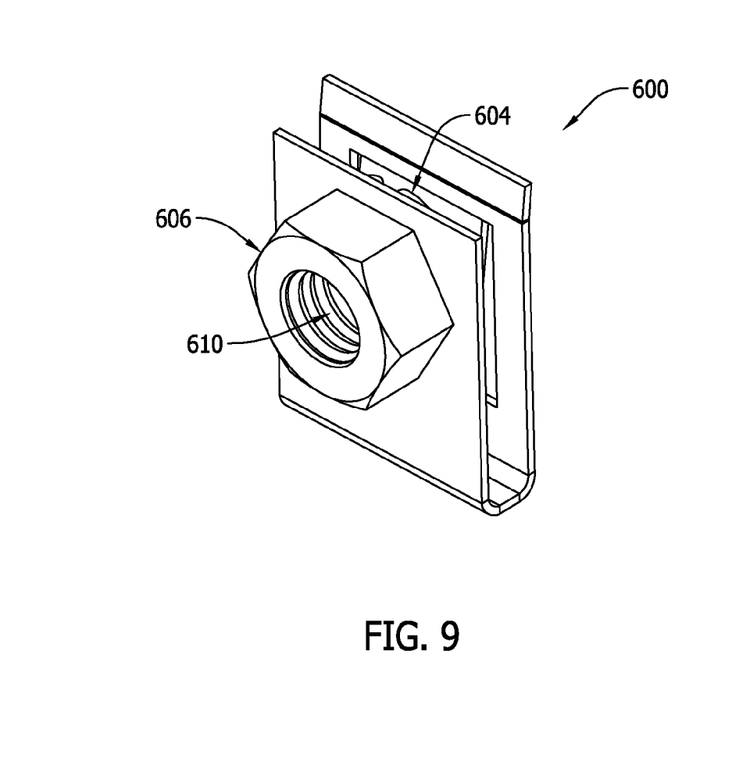
FIG. 9 is a perspective view of the clip shown in FIG. 8.
Figure 10:
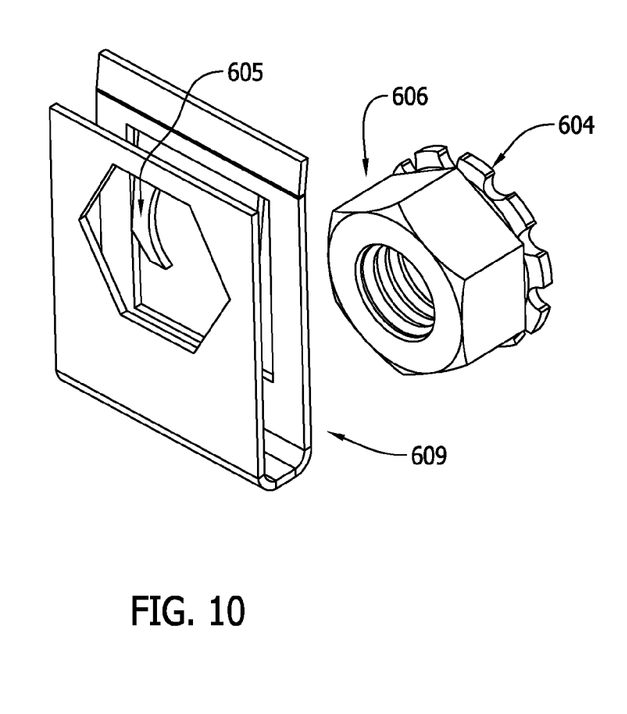
FIG. 10 is a perspective exploded view of the clip shown in FIG. 9.

FIG. 8 shows an example embodiment of grounding clip assembly 800 including grounding clip 600 (with nut 606 integrated thereto) and fastener 650 shown in FIG. 7. FIG. 9 shows the grounding clip 600 alone. For clarity, FIG. 10 shows a perspective exploded view of grounding clip 600. In the example embodiment, grounding clip 600 includes a first segment 601 and a second segment 602 spaced apart from first segment 601. Segments 601 and 602 are connected by a third segment 603, which is oriented substantially orthogonal to segments 601 and 602 such that segments 601, 602, and 603 form a u-shaped body 609. In other suitable embodiments, segments 601, 602, and 603 are shaped and oriented to form any structure that enables clip body to function as described herein.

The structure of segments 601, 602, 603 forms a receiving slot 607 with a volume that a connecting portion (e.g., frame 104) of solar module 302 occupies substantially when grounding clip 600 is attached to solar module 302. The width of the space between segments 601 and 602 is approximately the same as a thickness of the connecting portion of solar module 302. The connecting portion of solar module 302 includes a hole defined therethrough that receives fastener 650. Accordingly, a length of segments 601 and 602 can vary and is determined, in part, by the position of the hole on the connecting portion of solar module 302. In other suitable embodiments, segments 601 and 602 extend such that the space between segments 601 and 602 (i.e., receiving slot 607) is increased to enable a user to more easily slide grounding clip 600 onto the connecting portion of solar module 302. The connecting portion of the solar module 302 may be any portion of solar module 302, but is suitably on a lower portion of frame 104 as illustrated in FIG. 7.

Segments 601 and 602 both include apertures 610 and 611, respectively, for receiving fastener 650 therethrough. In the illustrated embodiment, the apertures 610 and 611 through segments 601 and 602 are substantially aligned. Aperture 611 in segment 602 is bounded by one or a plurality of locking finger(s) 605. Aperture 610 in segment 601 is sized to receive a nut 606 coupled to a washer 604. In the illustrated embodiment, nut 606 is positioned on a periphery of segment 601 and washer 604 is positioned within receiving slot 607. In the illustrated embodiment, nut 606 and washer 604 are integrally formed or otherwise connected to segment 601 to prohibit rotation of nut 606 when threadably connecting fastener 650 to nut 606.

Segments 601, 602, 603 are formed such that segments 601 and 602 engage edges of solar module 302. In the example embodiment, the connecting portion of frame 104 substantially fills the volume of receiving slot 607 and is in contact with segment 603. As shown in FIG. 7, grounding clip 600 is slid over solar module 302 such that washer 604 is in contact with frame 104 and rests above the hole defined through frame 104. Grounding clip 600 in combination with fastener 650 allows for more efficient installation and mounting of solar module 302 to rail 620. More specifically, when grounding clip 600 is attached over the mounting hole in solar module 302, a user may quickly and easily install fastener 650 through rail 620, frame 104, and grounding clip 600 to engage nut 606. Grounding clip 600, as described further below, is constructed such that the user need only hold and turn fastener 650 to engage fastener 650 to nut 606. That is, grounding clip 600 (and nut 606) is rotatably fixed with respect to connecting portion of solar module 302, such that a user does not have to hold grounding clip 600 to prevent nut 606 from rotating as fastener 650 engages nut 606.

Locking finger 605 is integrally formed with segment 602. As shown in FIG. 8, locking finger 605 extends into receiving slot 607 at an acute angle with respect to segment 602. As grounding clip 600 is slid over connecting portion of solar module 302, locking finger 605 contacts frame 104. Accordingly, locking finger 605 applies a force to the connecting portion of frame 104 as grounding clip 600 is slid thereon. The force applied to frame 104 assists grounding clip 600 in retaining its position on solar module 302 without assistance from a user or fastener 650. This feature allows a solar module installer to direct fastener 650 through rail 620, frame 104, and grounding clip 600 to engage nut 606 without supporting or holding grounding clip 600 or nut 606. Accordingly, solar module 302 is more quickly and easily attached to rail 620.

Washer 604 is connected to segment 601 and is positioned, at least partially, within receiving slot 607. In the illustrated embodiment, washer 604 contacts frame 104 when grounding clip 600 is placed thereon. Accordingly, when the clip is mounted on the connecting portion of solar module 302, locking finger 605 and washer 604 cooperate to hold grounding clip 600 in place. This feature allows a solar module installer to direct fastener 650 through rail 620, frame 104, and grounding clip 600 to engage nut 606 without supporting or holding grounding clip 600 or nut 606.

In the example embodiment, locking finger 605 and washer 604 have surface penetrating features (e.g., an abrasive external surface) that contact the connecting portion of solar module 302. The surface penetrating features of finger 605 and washer 604 penetrate non-conductive coatings on the surface of the solar module 302 and contact underlying conductive material as grounding clip 600 is attached thereto. This is relevant when clip 66 is utilized as an electrical grounding attachment. In the example embodiment, the surface penetrating features of finger 605 and washer 604 are suitable to create electrical contact between the solar module 302 and grounding clip 600 (and any electrical ground wire attached thereto). This serves to ensure grounding clip 600 creates an electrical connection with solar module 302 that is compliant with applicable electrical codes. Examples of non-conductive coatings on the on the solar module surface include anodization, paint, clear coats, oxidation, and any other non-electrical conductive material.

Example embodiments of nut 606 include a hex-nut, an acorn nut, a wing nut, or any other nut type and/or component including formed threads that is capable of engaging fastener 650. Example embodiments of washer 604 include an internal or external tooth lock washer, a conventional washer, or any other annular washer with a surface penetrating feature. In the example embodiment, nut 606 and washer 604 are welded or integrally formed with segment 601. In yet another embodiment, nut 606 and washer 604 are selectively detachable from segment 601.

Grounding clip 600 and its constituent parts described above are suitably constructed of a material capable of electrical conductance (e.g., metal). In another embodiment, the material of construction of grounding clip 600 and solar module 302 (or frame 104) are similar in electropotential and galvanic index to minimize galvanic corrosion there between when directly connected. This embodiment is relevant when grounding clip 600 acts as a grounding mechanism for solar module 302.

Figure 11:
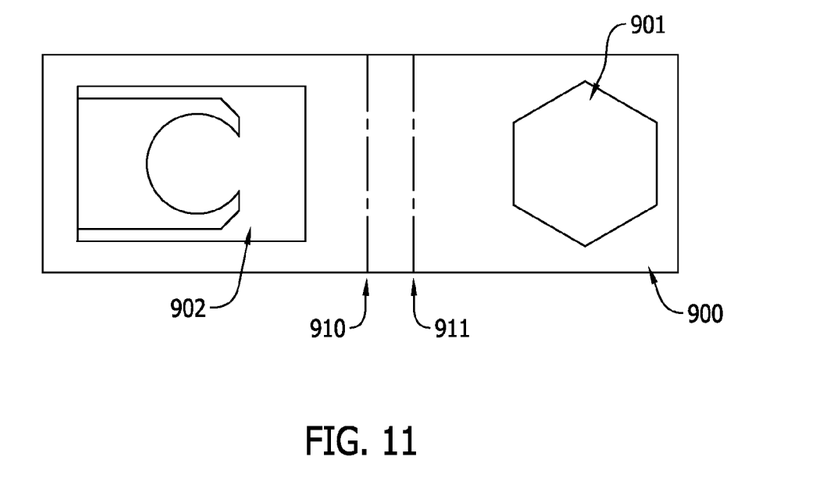
FIG. 11 is a plan view of a blank that may be used to manufacture the clip shown in FIG. 8.
Figure 12:
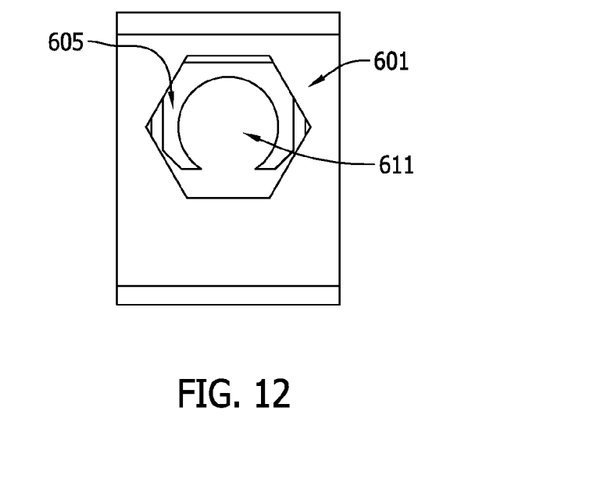
FIG. 12 is an end view of the clip shown in FIG. 8.

Grounding clip 600 may be manufactured using conventional metal pressing, stamping, and forming methods. As an example of manufacturing the example embodiment of grounding clip 600, a blank 900 as shown in FIG. 11 is punched, cut, or formed from a metallic material. In other embodiments, blank 900 may be other discrete shapes, including substantially annular. Subsequently, apertures 901 and 902 are punched, cut, or shaped at opposite ends of the blank 900. In the example embodiment, hole 901 is punched out to accommodate nut 606 and washer 604. At the opposite end of blank 900, aperture 902 is punched out to form locking finger 605 and a hole to allow fastener 650 to be positioned therein.

Subsequently, in the example embodiment, blank 900 is rolled, formed, or molded along lines 910 and 911 thereby creating segments 601 and 602, spaced apart, and connected by segment 603. One having ordinary skill in the art will appreciate that segments 601, 602, and 603 may alternatively be individually formed and connected (e.g., welded) to form body 609.

As shown in FIGS. 5 and 6, in an embodiment where grounding clip assembly 800 is used as an electrical grounding mechanism, an electrical connection 501 extends between grounding clip assembly 800 and grounded rack support 500. Connection 501 satisfies applicable electrical code requirements. One of ordinary skill in the art will appreciate the numerous methods available of directly or indirectly attaching electrical grounding wire from grounding clip assembly 800, which is connected to solar module 302, to grounded rack support 500.

Figure 13:
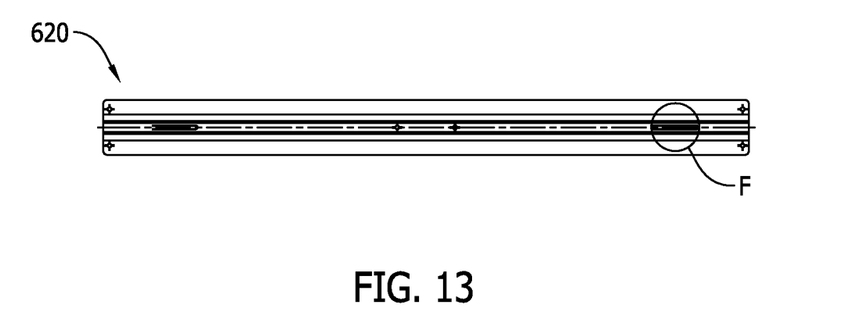
FIG. 13 is a plan view of the rail shown in FIG. 6.

FIG. 13 includes a planar view of rail 620 used to attach solar module 302 to an underlying rack assembly. Rail 620 has a length and width sufficient to span the length and width of an area under solar module 302 to be supported. Further, rail 620 has a thickness sufficient to support a load and other associated forces from the solar module 302 and rack assembly. However, the thickness of rail 620 is such that it meets the applicable structural codes and requirements, but does not excessively use expensive materials of construction.

Rail 620 is a structural element of the solar module array 300 and may be designed to withstand twenty or more years of exposure to environmental elements. Rail 620 is formed from zinc coated sheet steel in the example embodiment. In other embodiments, rail 620 may be made of any other suitable material providing sufficient rigidity including, for example, rolled or stamped stainless steel, plastic or carbon fiber.

Rail 620 of the present disclosure includes a wire retention tab 1001. Wire retention tab 1001 is formed by laser cutting, stamping, or thermally removing material across the entire thickness of rail 620, for a portion of the length and width of rail 620. That is, wire retention tab 1001 is formed integrally with rail 620 by removing material therefrom to create a portion (i.e., tab 1001) that may be manipulated to protrude from rail 620. Accordingly, at least a portion of the wire retention tab is attached to rail 620 at a deformation location 1002.

Figure 14:
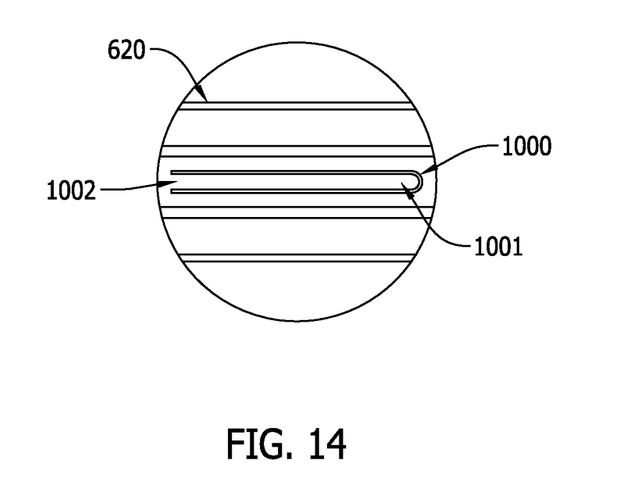
FIG. 14 is an enlarged view of the rail shown in circle F in FIGS. 6 and 13.

In the illustrated embodiment shown in FIG. 14, tab 1001 is formed by removing a u-shaped cutout 1000 from rail 620. Cut-out 1000 is a recess extending through at least a portion of rail 620 such that tab 1001 may be bent away from rail 620. In use, tab 1001 may be bent so as to be positioned substantially perpendicular to rail 620. A user may use a tool (e.g., pliers) or one or more fingers to bend tab 1001 away from rail. The tab 1001 remains connected to rail 620 at deformation location 1002.

With tab 1001 bent away from rail 620, a slot (not shown in the Figures) is exposed in rail 620. A user may then position a bundle of electrical wires and cords (e.g., from the overhead attached solar module) under the exposed slot. With the wires and cords positioned against rail 620, a user maneuvers tab 1001 over and around the wires and cords to hold them in position. The plasticity, flexural strength, and resilience of tab 1001 enable the user to harness and affix the bundle of wires and cords in place against rail 620.

Depending on the fabrication of tab 1001, edges of tab 1001 and/or portions of rail 620 surrounding tab 1001 may have a relatively rough and/or sharp profile that could potentially damage the wires and cords. Accordingly, in some embodiments, tab 1001 and/or rail 620 includes a protective feature that facilitates preventing abrasion of the wires and cords. The protective feature may include, for example, a protective sleeve that fits over tab 1001, a coating (e.g., a rubber or vinyl coating) applied by spraying and/or dipping tab 1001 and/or rail 620, or a cover piece that couples to tab 1001 and/or rail 620 to reduce the abrasive impact of tab 1001 and/or rail 620. Further, in some embodiments, to form tab 1001, rail 620 is punched using a machining process that forms dull surfaces on the side of tab 1001 that faces the wires, and forms sharp ends (or "lances") on the opposite side of tab 1001 such that the sharp ends face outward away from the wires.

The length and width of tab 1001 (formed by cutout 1000) may vary depending upon a number of factors including the plasticity, resilience, and strength of the material of construction of rail 620, the number of wires and cords (and the overall diameter thereof) to be held in place against rail 620, the thickness of rail 620, and whether human hands or tools are to be used to bend tab 1001 at deformation location 1002. Taking each of these factors into consideration provides an iterative process of determining the thickness of rail 620 and the length and width of tab 1001. In the example embodiment, a user is able to quickly bend tab 1001 away from rail 620 with a first hand, grab and position electrical wires and cords appropriately for harnessing with a second hand, and quickly wrap and deform tab 1001 around the electrical wires and cords with the first hand.

Accordingly, tabs consistent with the present disclosure may provide several advantages over prior methods of harnessing wires under solar module arrays 300. First, the tab allows a solar module array installer to quickly and efficiently harness electrical wires and cords to the structure of the solar module array 300. In addition to time savings, material costs are reduced as expensive additional parts including clips, cable ties, and fasteners are no longer required to harness electrical wires. As the harness is built into the supporting rails of the solar module array 300, the harness (i.e., tab 1001) of the present disclosure is also more resilient (e.g., to ultraviolet radiation exposure) than previous solutions. Further, tab 1001 may also be formed as part of other members of the rack assembly to guide electrical wires to electrical supply hub(s).

When introducing elements of the present invention or the embodiments thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the invention, it is intended that all matter contained in the above description and shown in the accompanying figures shall be interpreted as illustrative and not in a limiting sense.

What is claimed is:

1. A solar module assembly comprising:
 a solar module comprising:
  a solar panel; and
  a frame coupled to the solar panel;
 a grounding clip comprising:
  a u-shaped body attached to the frame of the solar module, the u-shaped body including a first segment and a second segment spaced apart from the first segment, the first segment and second segment connected by a third segment;
a nut coupled to the first segment such that the nut is not rotatable with respect to the first segment; and
a washer coupled to the nut, the washer positioned between the first segment and the second segment; and
a rail coupled to the frame of the solar module to support the solar module, the rail including a tab integrally formed on a surface of the rail and defined by a cutout extending through the surface of the rail, the tab sized and shaped to support and position at least one electrical wire, the tab including a deformation location coupled to the rail.

2. The solar module assembly of claim 1, wherein an aperture extends through the first segment, the second segment, the washer, the rail, and the nut.

3. The solar module assembly of claim 2 further comprising a fastener configured to engage the nut when the fastener extends through the aperture.

4. The solar module assembly of claim 1 further comprising an electrical grounding wire connected to one of the grounding clip and a conductive portion of the rail to facilitate electrically grounding the rail.

5. The solar module assembly of claim 4, wherein the electrical grounding wire is also connected to an electrically grounded rack support such that the electrical grounding wire provides a ground path between the frame and the electrically grounded rack support.

6. The solar module assembly of claim 1, wherein at least a portion of the at least one electrical wire is supported by the tab.

7. The solar module assembly of claim 1, wherein the washer includes a plurality of surface penetrating features configured to pierce a non-conductive portion of the frame to create electrical contact between the washer and the solar module frame.

8. The solar module assembly of claim 1, wherein the second segment includes at least one locking finger configured to contact the frame to facilitate retaining the grounding clip on the module frame.

9. The solar module assembly of claim 1, wherein the tab is moveable between a first position substantially parallel with the surface of the rail and a second position at which at least a portion of the tab extends away from the surface of the rail.

10. The solar module assembly of claim 9, wherein the tab is substantially coplanar with the surface of the rail in the first position.

11. The solar module assembly of claim 1, wherein the tab is moveable by bending the tab relative to the rail at the deformation location.

12. The solar module assembly of claim 1, wherein the cutout is U-shaped.

13. The solar module assembly of claim 1, wherein a nut-shaped aperture extends through the first segment of the u-shaped body and at least a portion of the nut extends into the nut-shaped aperture to couple the nut to the first segment such that the nut is not rotatable with respect to the first segment.

14. The solar module assembly of claim 13, wherein the washer coupled to the nut is larger than the nut-shaped aperture to prevent the nut from being completely removed from the nut-shaped aperture in a first direction.

* * * * *